United States Patent

Torok

[15] 3,705,328

[45] Dec. 5, 1972

[54] ELECTRONIC ZOOMING IN VIDEO CAMERAS BY CONTROL OF THE DEFLECTION SYSTEM

[72] Inventor: Gabor Peter Torok, Lincroft, N.J.

[73] Assignee: Bell Telephone Laboratories, Incorporated, Murray Hill, N.J.

[22] Filed: May 1, 1970

[21] Appl. No.: 33,784

[52] U.S. Cl. ....................315/26, 178/7.5 SE, 315/23

[51] Int. Cl. ..............................................H01j 29/70

[58] Field of Search ..315/26, 31; 178/7.5 SE, DIG. 6

[56] References Cited

UNITED STATES PATENTS

| | | | |
|---|---|---|---|
| 2,098,390 | 11/1937 | Iams | 178/7.5 SE |
| 3,523,208 | 8/1970 | Bodmer et al. | 315/10 |
| 3,509,367 | 4/1970 | Orsen | 307/228 |

*Primary Examiner*—Benjamin A. Borchelt
*Assistant Examiner*—R. Kinberg
*Attorney*—R. J. Guenther and E. W. Adams, Jr.

[57] ABSTRACT

Circuitry is disclosed for providing manually controlled electronic size variation (zooming) of the scanned raster in television camera systems. A single control provides a zoom signal which is applied independently to the horizontal and vertical deflection circuits. The zoom signal simultaneously affects the amplitudes of both sweep signals so that the area of the target which is scanned (raster area) maintains a constant aspect ratio while the size of the raster may be varied by the single control. An area of constant size is used to display the video signals for all camera raster sizes, and zooming is achieved when a portion of the image formed on the camera target is reproduced on the full size display.

5 Claims, 8 Drawing Figures

INVENTOR
G. P. TOROK
BY David L. Hurewitz
ATTORNEY

FIG. 4
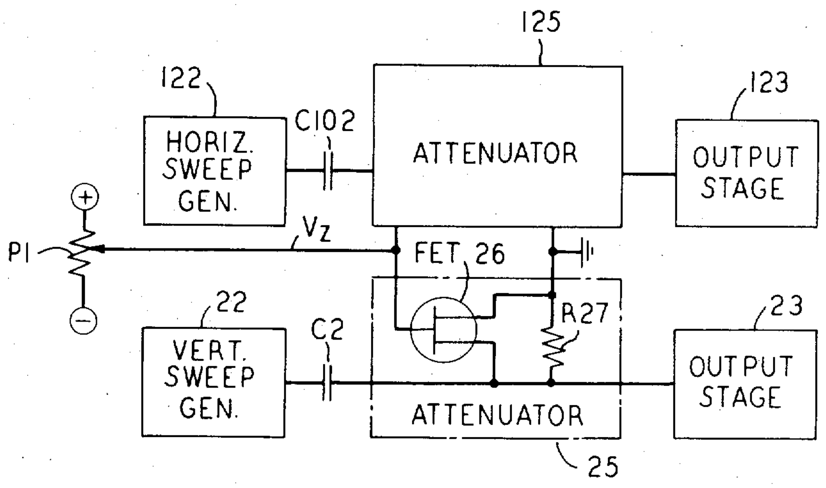
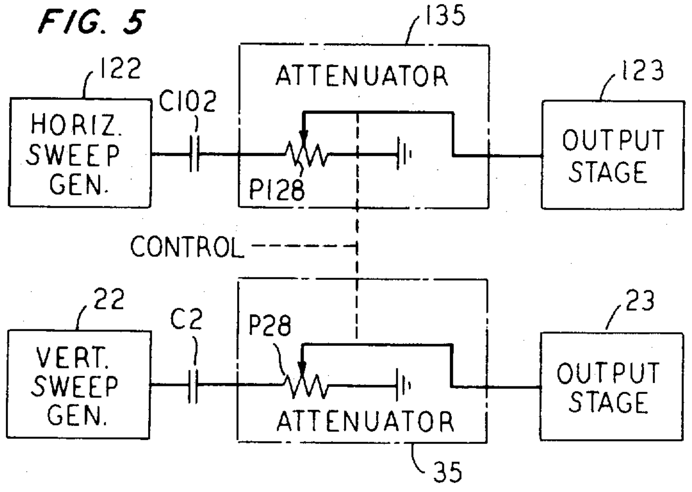
FIG. 6
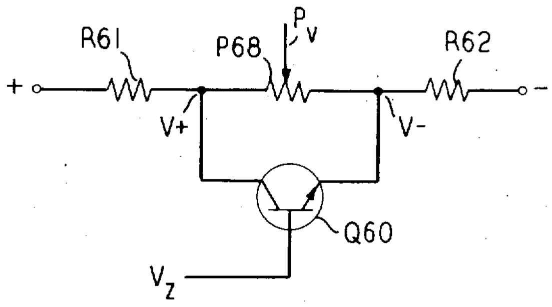

ELECTRONIC ZOOMING IN VIDEO CAMERAS BY CONTROL OF THE DEFLECTION SYSTEM

BACKGROUND OF THE INVENTION

This invention relates to video transmission systems with zooming capability, and more particularly to an improved camera having manual control of the raster size.

In numerous television systems the camera is equipped with apparatus so that it may "zoom in" on the scene, resulting in an enlarged view of a portion of the scene being reproduced at the display. Conventionally such zooming is achieved by mechanical adjustment of the optical system, normally by altering the effective focal length of the camera's objective lens. The required optical apparatus is expensive, but is conventionally used in commercial broadcast television systems because high picture quality is maintained in the wide and narrow angle modes and throughout the zoom range.

In the PICTUREPHONE visual telephone system and other nonbroadcast systems which have large numbers of cameras, economic limitations are severe and the costs associated with mechanical adjustment of focal length are prohibitive. Zooming can be produced by electronic circuitry without control of the optical parameters. In conventional pickup tubes, such as vidicons, if the size of the raster is increased or its position is changed, the edges of the previous raster are clearly visible in the displayed picture due to a phenomena called raster burn-in which is caused by the differential sensitivity to light caused by the differing durations for which the scanning beam was focused on the individual portions of the target. This raster burn-in makes electronic zooming impractical, and unacceptable in terms of human factor engineering. However, the recently developed solid-state electron tube utilizing a target composed of photo diodes is free from burn-in and hence electronic zooming is exceedingly attractive for use with that type of pickup tube. One technique for such electronic zooming contemplates varying the electron beam accelerating potential to alter the size of the scanned raster and cause the output video signal to contain information of only a portion of the image formed on the face of the target.

Control of accelerating potential does provide zooming but it requires an auxiliary and costly low voltage circuit for control of the high voltage. In addition, in modes using low potential, the camera resolution is substantially reduced; and magnetic focusing techniques are not practical since the ratio of focusing current to accelerating potential is critical. In a system using permanent magnet focusing, control of accelerating potential can not be used for zooming.

SUMMARY OF THE INVENTION

It is an object of the present invention to provide a technique suitable for use with solid-state cathode ray pickup tubes which provides electronic zooming by control of the deflection flux, and more specifically, by varying the current through the deflection coils. It is a further object to provide control of the deflection system so that the aspect ratio is maintained while the raster size is varied and its position controlled.

In accordance with the invention, a solid-state electron beam tube camera is provided with a single control which varies the amplitudes of both the horizontal and vertical deflection waveforms, thus altering the raster size while maintaining a constant aspect ratio. In the fully zoomed or narrow angle mode, the scanned raster area is a small portion of the pickup tube target, while in the wide angle mode the entire target is scanned. The picture resolution is, of course, more limited in the narrow angle condition, but in systems such as the PICTUREPHONE visual telephone system, where the object to image distance is substantially constant, the loss of resolution is substantially offset by the increased magnification. In addition to zooming capability, the camera is equipped with circuitry for positioning the reduced raster in the narrow angle mode. This enables the zooming to be directed to a specific portion of the scene. Both controls may be manually operated by the user in the case of a visual telephone system. A number of arrangements for providing sweep controlled zooming are possible. According to one embodiment, a dc zoom signal is produced by a single potentiometer, whose output voltage controls a current source in each of two similar sweep generators. In other embodiments zooming results from substantially identical attenuation of the horizontal and vertical sweep waveforms.

The sweep circuits consist of a sweep waveform generator using a voltage controlled current source and a feedback amplifier output stage. For higher dc accuracy and stability, capacitive coupling is used between the generator and output stage. At the low frequency, such as the 60 Hz rate conventionally used for the vertical sweep, the desired high sweep linearity dictates the use of capacitive coupling with a long time constant in the vertical sweep circuit. When zooming, a dc shift is generated in the vertical sweep generator and the unacceptably long time to return the steady state which would be provided by a conventional circuit is eliminated by a compensating network coupled to the zooming control.

In addition, a position adjustment which provides controlled location of the scanned area may be coupled to the output stage of either the vertical or horizontal deflection systems, or both, by being applied to the negative feedback input of the output stage. This adjustment is associated with the zooming control to limit the adjustment range and insure that the scanned raster covers the selected portion of the target throughout the zoom procedure. Ganging the positioning and zoom controls provides the range limitation, but alternatively an electronic circuit, whose output restricts the positioning control signal to appropriate limits throughout all zoom positions, can be used.

BRIEF DESCRIPTION OF THE DRAWING

FIG. 4 is a diagram illustrating an alternative embodiment of sweep controlled zooming.

FIG. 5 is a diagram illustrating an additional embodiment of sweep controlled zooming.

FIG. 6 is a schematic diagram of a range limited positioning control circuit suitable as an alternative to the ganged potentiometers in FIG. 1.

DETAILED DESCRIPTION

Figure 1:
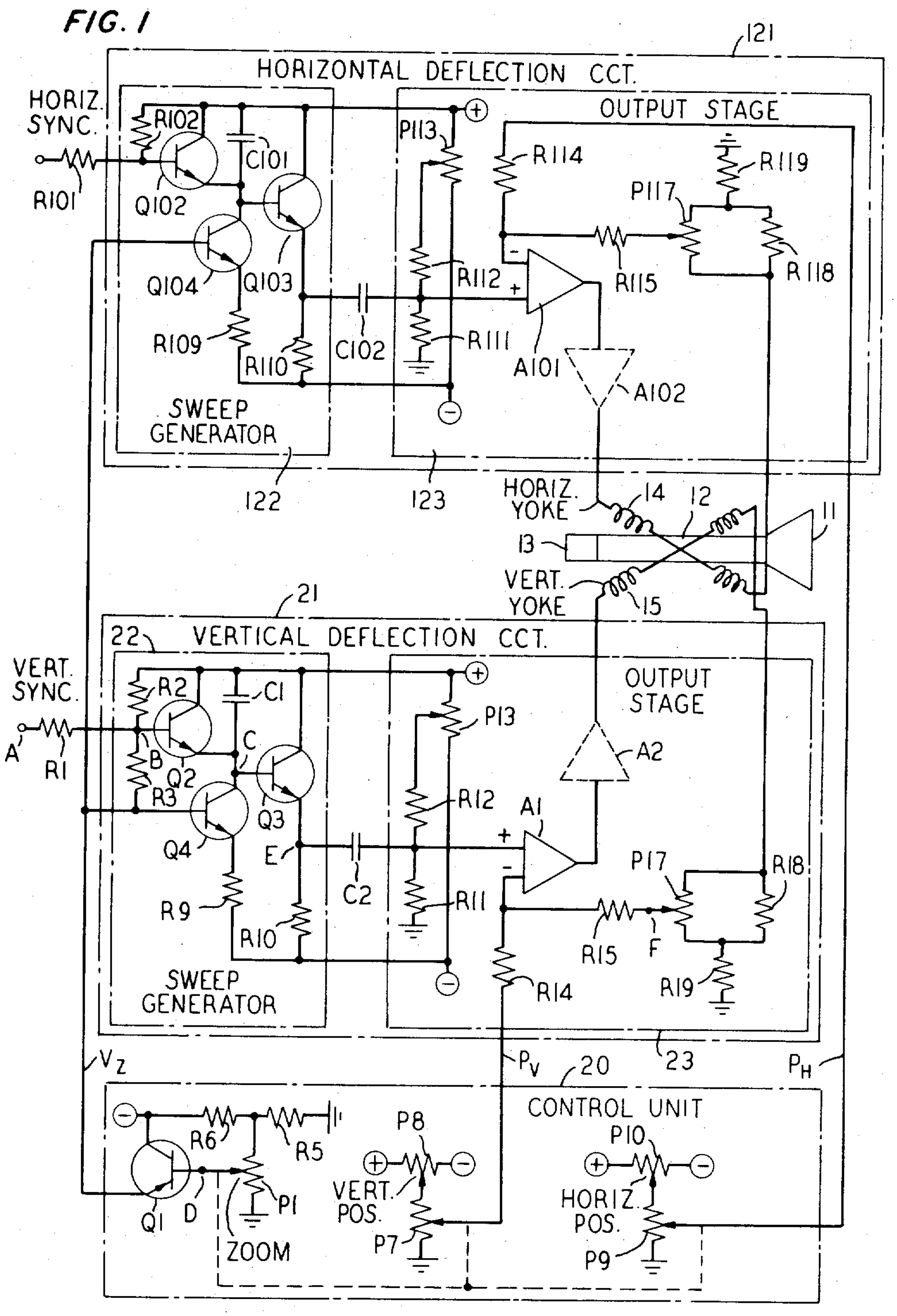
FIG. 1 is a block and schematic diagram of one embodiment of the sweep controlled zooming in accordance with the invention, illustrating in particular the details of the sweep circuitry.

In accordance with the invention as illustrated in FIG. 1, an image of a scene is formed on the target 11 of a solid-state cathode ray pickup tube 12. An electron beam source 13 produces a conventional scanning beam. The beam sweeps the target in successive horizontal lines under the control of a magnetic deflection pattern established by a horizontal coil or yoke 14 and a perpendicularly oriented vertical coil or yoke 15. The mechanisms for sensing the light intensity on the target at the scanned points and for causing the required beam deflection are well known and will not be described in detail except as they are required to comprehend the invention.

Figure 2A:
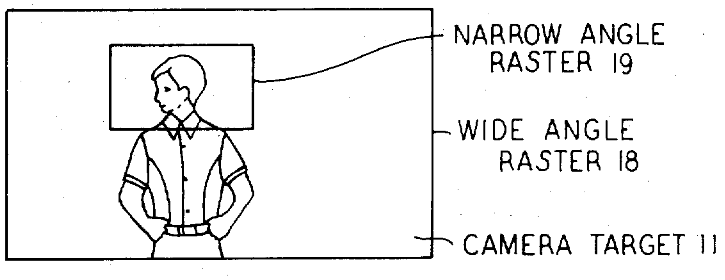
FIGS. 2A, 2B and 2C are diagrams illustrating the zoom operation.
Figure 2B:
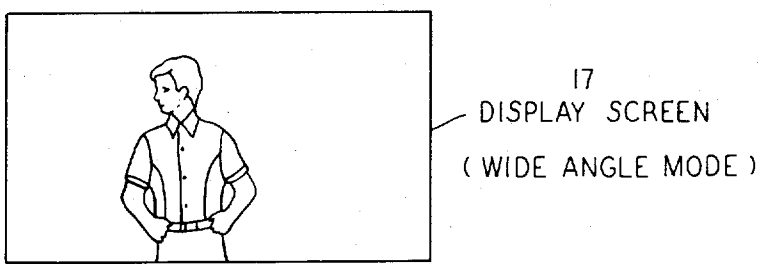
Figure 2C:
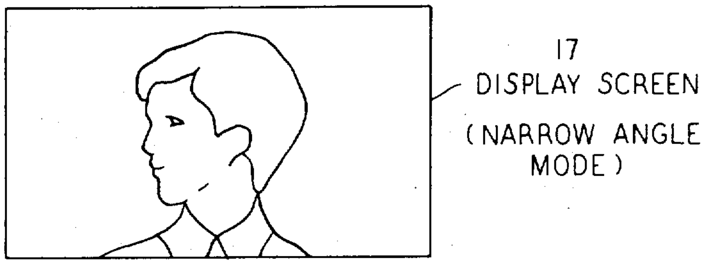

In the normal or wide angle mode the system operates conventionally and the complete image on the target 11 is reproduced at a display on the normal sized viewing area of the screen of a cathode ray picture tube. This is illustrated in FIG. 2B where the total viewing area of the display screen 17 is used to reproduce the image within the wide angle raster 18 of the target 11 in FIG. 2A. In accordance with the invention the camera can also be made to zoom by controlling the deflection pattern so that the electron beam scans only a portion, designated narrow angle raster 19, of the target 11 in the time ordinarily allocated to scanning the entire target. Narrow angle raster 19 has the same aspect ratio, or vertical to horizontal dimensions, as does the wide angle raster 18. The resultant video signal is treated like any normal signal at the display and reproduced, as shown in FIG. 2C, on the normal sized viewing area of the display screen 17, thus creating in this narrow angle mode a magnified view of the small portion of the image within raster 19.

Referring again to FIG. 1, horizontal deflection circuit 121 consists of a horizontal sweep generator 122 for generating a sawtooth voltage from a constant current source triggered by a sync signal and a horizontal amplifier output stage 123 for converting the voltage to a current waveform. The output waveform is applied to the horizontal yoke 14 where it causes deflection in the conventional manner. Vertical deflection circuit 21 is similarly composed of vertical sweep generator 22 and vertical amplifier output stage 23, and its output is applied to vertical yoke 15. In addition to the embodiment shown in FIG. 1, other deflection circuits are well known and could be equipped with electronic zooming in accordance with the present invention by one skilled in the art.

Control unit 20 provides a manually variable dc voltage, such as may be produced by potentiometer P1. This voltage is used to control the current amplitudes of both the horizontal and vertical current sources in the vertical and horizontal deflection circuits 21 and 121. Deflection circuits 21 and 121 are designed similarly and the application of the same control voltage provides control of the raster size without changing the aspect ratio. This control voltage on the wiper (point D) of potentiometer P1 can be any value between the limits of zero and a negative voltage as determined by the values of resistors R5 and R6 arranged to form a voltage divider. The values of these two resistors determine the zoom ratio, [R5+R6]/R6. The upper or ground potential corresponds to the wide angle mode; conversely the lower voltage corresponds to the narrow angle or zoom mode.

The dc voltage provided by potentiometer P1 is applied to the base of emitter follower transistor Q1, and the emitter of Q1 supplies the zoom control voltage $V_Z$ to the current source formed by transistor Q4 and resistor R9 in the vertical sweep generator 22 and to a similar current source formed by transistor Q104 and resistor R109 in the horizontal sweep generator 122. Transistor Q1 serves two functions. First, its emitter-follower characteristics provide impedance isolation between potentiometer P1 and the two sweep generators 22 and 122, thus preventing the loading of P1. Second, any change in the base-emitter voltages of Q4 and Q104 due to temperature variation will be balanced by an identical change in the base-emitter voltage of Q1, thus providing temperature compensation.

The horizontal and vertical deflection systems operate in a substantially identical manner which will be described with reference to the vertical system 21. Capacitor C1 is charged by the current source consisting of Q4 and R9. The resulting negative sloping ramp voltage at point C is isolated from coupling capacitor C2 by emitter follower Q3 and resistor R10. During the active sweep time the vertical sync signal applied at point A through resistor R1 is at ground potential and the voltage at point B is sufficiently negative to maintain the base-emitter junction of Q2 reverse biased. During retrace the sync pulse has a positive voltage which biases Q2 ON to provide a discharge path for C1. The peak-to-peak signal amplitude at point C is directly linearly proportional to the current through R9 of the current source, and that current is directly proportional to the dc control voltage at point D produced by the manual control of potentiometer P1.

The periodic ramp waveform at E is coupled to the vertical output stage 23 through C2. Because of the high input impedance of operational amplifier A1 it is possible to use a large input resistor R11 and a comparatively small coupling capacitor C2. The factory centering adjustment is accomplished by a resistive divider, consisting of resistors R11, R12 and centering potentiometer P13.

Operational amplifier A1 is used as a comparator and current driver. The amplifier must produce an output current sufficient to drive the vertical yoke 15. Amplifier A1 may be of the type having high output current capability, such as is the Western Electric type 41B operational amplifier, or alternatively amplifier A1 may be an ordinary operational amplifier, such as the Motorola MC 1433G, in which case it would be followed by a conventional current booster A2. The output of sweep generator 22 is applied to the positive or noninverting input of amplifier A1 and current feedback, which is used to obtain high sweep linearity, is applied to the inverted or negative input. In this configuration the voltage at the negative terminal follows the positive terminal with an output providing an error signal to maintain this condition. This action forms at point F a ramp voltage across the control resistor combination formed by resistor P17 and resistors R18 and R19. As illustrated, resistor P17 may be a potentiometer which provides factory size adjustment. The ramp voltage at F on the wiper of P17 forces a ramp current to be drawn through the vertical yoke 15 providing the vertical beam deflection in the conventional manner. R15 matches the input impedance to amplifier A1.

Figure 3:
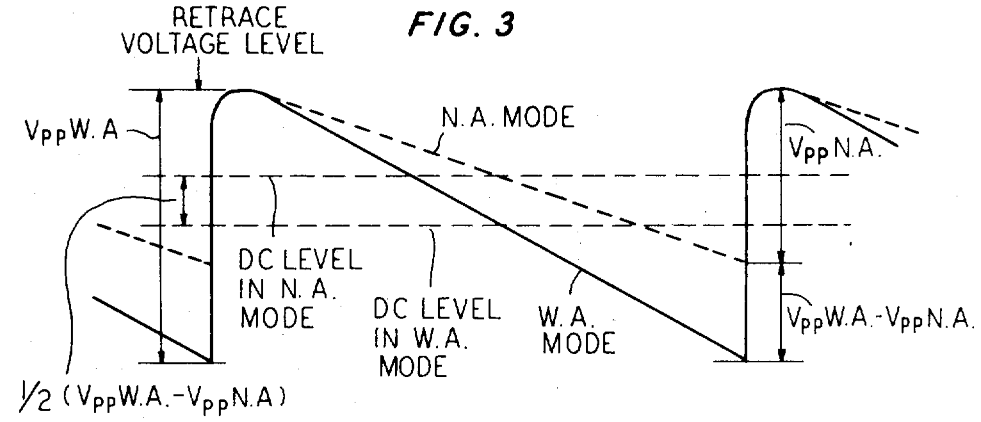
FIG. 3 is a waveform helpful in discussing the invention.

As described above, vertical sweep generator 22 is ac coupled to output stage 23 by capacitor C2 and for good linearity the coupling time constant should be much larger than the sweep duration. Since the zooming action involves a dc shift of the sweep generator's voltage ramp, the resulting settling time is sufficiently long to be annoying and may cause the scanned raster to jump, creating visually noticeable flashes and movement of the picture. For this reason a compensating circuit is used which maintains the dc level of the generated voltage ramp. The emitter of Q1 is connected to the base of Q2 through resistor R3 which forms a voltage divider with R2. The values of R2 and R3 are chosen such that the dc level to which the capacitor C1 is discharged at point B is shifted during zooming so as to offset the shift in the dc level caused by the change in peak-to-peak amplitude at point C and hence at point E. The base to emitter voltage drop of Q2 is a constant and does not affect the transient response. In distinction, FIG. 3 shows the effect of a change in the peak-to-peak amplitude on the dc level with no compensation. The change in dc level is exactly one-half the difference between the wide angle peak-to-peak voltage, $V_{pp}WA$, and the narrow angle peak-to-peak voltage, $V_{pp}NA$. Since the voltage change at D, designated $\Delta V_D$, and therefore the voltage change at the emitter of Q1 is known, it is necessary only to select the values of R2 and R3 to satisfy:

$$(V_{pp}WA - V_{pp}NA)/2 = \Delta V_D \, R2/(R2+R3).$$

Control unit 20 may also provide signals for control of the raster position. As illustrated, the vertical positioning signal $P_V$ is applied to the negative terminal of amplifier A1. Vertical positioning is provided by manually varying potentiometer P8 to produce a dc voltage which is attenuated by a voltage divider consisting of resistors R14 and R15 chosen so that the maximum voltage is equal to the difference between the wide and narrow angle mode peak-to-peak voltages. This control voltage is applied to the negative terminal of operational amplifier A1, thereby producing a dc shift in the current through yoke 15 which adjusts the vertical position of the raster. Vertical positioning signal $P_V$ is, however, range limited by auxiliary potentiometer P7 which is ganged to zoom control potentiometer P1. In the wide angle mode (ground position of P1) the wiper of P7 is grounded, thus prohibiting any vertical positioning control and insuring that the total area of the target is utilized by the raster. With increasing zoom settings proportionate increases in the height control are possible and in the narrow angle mode the full range of position control provided by P8 is applied to the output stage 23. By coupling the position control circuit to the feedback path in the output stage 23 this dc signal is separated from the ac coupling and the variable dc shift provided by the positioning circuit is isolated from the sweep generator 23.

The horizontal deflection circuit 121 is substantially the same as vertical deflection circuit 121, and elements in horizontal deflection circuit 121 are designated by numerals 100 higher than corresponding elements in vertical deflection circuit 21. The horizontal sweep generator 122 and the vertical sweep generator 22 are functionally identical though different electrical values may be required due to different parameters, such as scan time. A ramp voltage is formed by Q104, R109 and C101 and is coupled by capacitor C102 with isolation provided by Q103 and resistor R110. The horizontal sync pulse is applied in the same fashion as is the vertical sync pulse and the horizontal sweep generator operates in the same manner as the vertical sweep generator described above. The compensation provided by R3 in the vertical system is, however, not required in the horizontal circuit because the active sweep time is so much shorter that the transient caused by the manually produced dc shift dies out rapidly before it causes a noticeable picture shift.

As in the corresponding vertical circuit, resistors R111, R112 and potentiometer P113 provide a dc factory centering circuit and an operational amplifier A101 operates in a current feedback mode. Amplifier A101 must provide sufficiently high current and voltage signal to drive horizontal yoke 14, or alternatively a conventional current booster A102, which may be a voltage to current converter and amplifier such as a push-pull current source driven by a voltage signal, may be connected serially to produce the required drive current. A ramp current is drawn by amplifier A101 through the horizontal yoke 14 and through the feedback resistor combination consisting of potentiometer P117 and resistors R118 and R119 which forms the factory size control circuit. R115 matches the input impedances of A101.

The sweep amplitudes of both the vertical and horizontal waveforms are proportional to the dc zoom voltage and hence this proportionality is frequency independent so that in a typical scanning system common control of the two waveforms is possible where the horizontal scan rate is substantially higher than the vertical scan frequency. Since the horizontal and vertical deflection circuits differ primarily in component values, the exact tracking and constant aspect ratio is achieved.

Control unit 20 may also provide a horizontal positioning signal $P_H$ produced by potentiometer P10 and range limited by potentiometer P9 in a manner identical to the production of vertical positioning signal $P_V$. The horizontal signal $P_H$ is applied to the feedback path of A101 through R114.

Compensation for oscillations or undesired transients and suppression of noise, as well as other normal subcircuits which are not shown, may be provided in a straightforward manner by one knowledgeable in the art. Mechanisms for producing a common zoom control signal other than potentiometers are, of course, apparent and position range limitation may be achieved without ganged potentiometers. Some such modifications of the representative circuit of FIG. 1 are discussed below.

FIGS. 4 and 5 illustrate modified arrangements for variably controlling the horizontal and vertical sweep amplitudes from a common control in lieu of applying a variable voltage to the current sources of the sweep generator as described above in reference of FIG. 1.

Sweep generators 22 and 122 are ac coupled to output stages 23 and 123 by capacitors C2 and C102, respectively. Between the ac coupling and the output stages the signals are attenuated by identically designed attenuators.

In FIG. 4 the attenuators 25 and 125 each consist of identical linear variolossers formed by field effect transistor FET 26 and parallel resistor R27 and the single variable zoom voltage $V_Z$ is applied to the base of the FETs. The attenuators 25 and 125 must be identically matched in order to provide a constant aspect ratio. FIG. 5 illustrates alternative attenuators 35 and 135 each, consisting simply of a potentiometer P28 and P128 respectively, interposed in the path between the coupling capacitor and the output stage.

In FIG. 1 control unit 20 contains position control potentiometers P8 and P10, the output of each of which is range limited by auxiliary potentiometers P7 and P9, respectively which are each ganged to zoom potentiometer P1. Alternatively the range limiting function can be performed electronically. FIG. 6 illustrates one arrangement for range limiting the vertical position control, for example. Positioning and auxiliary potentiometers P8 and P7 are replaced by positioning potentiometer P68 and a unity gain amplifier consisting of transistor Q60, resistors R61 and R62. Zoom voltage $V_Z$ is applied to the base of Q60. A symmetrical power supply provides equal positive and negative dc voltages and matched resistors R61 and R62 provide a balance and insure that voltages V+ and V− have the same magnitudes. When $V_Z$ is zero in the wide angle mode, the magnitudes of V− and V+ are equal and approximately zero (neglecting the diode drops of Q1 and Q60); Q60 is saturated so that the range limiting vertical positioning control signal $P_V$ is zero for any setting of vertical positioning potentiometer P68. For any other zoom position the magnitudes of V− and V+ are equal and are approximately equal to the magnitude of $V_Z$, and these symmetrical voltages across P68 provide the appropriate range for the position control $P_V$.

Range limiting can also be provided by a multiplier which combines zoom voltage $V_Z$ with the output of the positioning potentiometer, such as P8 in FIG. 1. The multiplier output is applied to the output stage of the deflection circuit. This output, which is the range limiting positioning control signal, is the product of the zoom voltage $V_Z$, the manually selected position voltage and a constant. It is zero for the wide angle mode when $V_Z$ is zero and is continuously variable within appropriate limits for all other zoom positions.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In a video camera system, deflection circuitry for controlling the scan pattern of an electron beam across a target comprising:

orthogonal horizontal and vertical deflection yokes for directing the scan pattern of the electron beam in response to current through the yokes, horizontal deflection means for producing a horizontal sweep current and for applying the horizontal sweep current to said horizontal yoke, vertical deflection means for producing a vertical sweep current and for applying the vertical sweep current to said vertical yoke, zoom adjusting means connected to each of said deflection means for simultaneously applying a common dc zoom voltage to each of the deflection means to control the amplitudes of both sweep currents over a continuous range so that the electron beam may be adjusted to scan rasters of different sizes, each having the same selected aspect ratio, both said vertical and horizontal deflection means including respectively vertical and horizontal sweep generators which both include a capacitor, a constant current source for charging said capacitor, the voltage produced by said current source having an amplitude controlled by the common dc zoom voltage, and trigger means for periodically discharging said capacitor to a variable dc voltage level to produce a periodic ramp voltage, and said vertical sweep generator further including a voltage divider for attenuating the common dc zoom voltage to compensate for variations of the dc component of the ramp voltage to maintain the dc component constant with changes in the vertical sweep amplitude caused by the common dc zoom voltage.

2. In a video camera system, deflection circuitry for controlling the scan pattern of an electron beam across a target comprising:

orthogonal horizontal and vertical deflection yokes for directing the scan pattern of the electron beam in response to current through the yokes, horizontal deflection means for producing a horizontal sweep current and for applying the horizontal sweep current to said horizontal yoke, vertical deflection means for producing a vertical sweep current and for applying the vertical sweep current to said vertical yoke, zoom adjusting means connected to each of said deflection means for simultaneously applying a common dc zoom voltage to each of the deflection means to control the amplitudes of both sweep currents over a continuous range so that the electron beam may be adjusted to scan rasters of differing sizes, each having the same selected aspect ratio, and at least one of said deflection means including an operational amplifier and a current feedback path from the corresponding yoke to the negative input of said amplifier, and position adjusting means for applying a variable dc positioning voltage to the feedback path to cause a dc shift in the sweep current produced by said one deflection means.

3. A video camera system as claimed in claim 2 wherein associated with said position adjusting means is means for attenuating the variable dc positioning voltage proportionally with the variation of said zoom adjusting means so that the position adjustment is range limited.

4. A video camera system as claimed in claim 2 wherein said position adjusting means includes a positioning potentiometer, the wiper of which provides the variable dc positioning voltage, and means for restricting the voltage across said potentiometer in proportion to the change of amplitude of the sweep currents provided by said zoom adjusting means.

5. Electronic zooming apparatus for a video camera system comprising:

a solid-state target on which an image is formed, means for producing an electron beam, horizontal deflection means for producing a horizontal sweep signal for periodically shifting the electron beam to scan the target in a horizontal direction, vertical deflection means for producing a vertical sweep signal for periodically shifting the electron beam to scan said target in a vertical direction, said horizontal and vertical deflection means each comprising a sweep generator, said sweep generators both including a capacitor, a constant current source for charging said capacitor, and trigger means for periodically discharging said capacitor to a variable dc voltage level to produce a periodic ramp voltage, adjusting means for producing a dc zoom voltage and for simultaneously applying said dc zoom voltage to each of said deflection means to simultaneously control the voltage produced by each of said constant current sources over a continuous range so that the electron beam may scan rasters of different sizes, each having the same aspect ratio, and said vertical sweep generator further including a voltage divider for attenuating the dc zoom voltage to compensate for variations of the dc component of the ramp voltage to maintain the dc component constant with changes in the vertical sweep amplitude caused by the dc zoom voltage.

* * * * *